United States Patent
Han et al.

(10) Patent No.: US 11,743,823 B2
(45) Date of Patent: Aug. 29, 2023

(54) EFFICIENT MICO MODE MANAGEMENT METHOD UTILIZING NETWORK ANALYSIS INFORMATION IN 5G MOBILE NETWORK SYSTEM

(71) Applicant: Samsung Electronics Co., Ltd., Suwon-si (KR)

(72) Inventors: Yoonseon Han, Suwon-si (KR); Sunghoon Kim, Suwon-si (KR); Sangjun Moon, Suwon-si (KR); Jungshin Park, Suwon-si (KR); Jungje Son, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/232,134

(22) Filed: Apr. 15, 2021

(65) Prior Publication Data
US 2021/0314868 A1 Oct. 7, 2021

Related U.S. Application Data

(63) Continuation of application No. 16/593,922, filed on Oct. 4, 2019, now Pat. No. 10,986,579.

(30) Foreign Application Priority Data

Oct. 5, 2018 (KR) .......................... 10-2018-0119025

(51) Int. Cl.
*H04W 52/02* (2009.01)
*H04W 60/00* (2009.01)
(Continued)

(52) U.S. Cl.
CPC ......... *H04W 52/0235* (2013.01); *H04W 8/22* (2013.01); *H04W 16/18* (2013.01);
(Continued)

(58) Field of Classification Search
CPC ... H04W 52/0235; H04W 8/22; H04W 60/00; H04W 76/27; H04W 16/18; H04W 24/02;
(Continued)

(56) References Cited

U.S. PATENT DOCUMENTS

| 2018/0227872 | A1* | 8/2018 | Li ........................ H04W 76/20 |
| 2018/0262924 | A1* | 9/2018 | Dao ..................... H04W 24/02 |
| 2019/0021064 | A1 | 1/2019 | Ryu et al. |

FOREIGN PATENT DOCUMENTS

WO 2018/008944 A1 1/2018

OTHER PUBLICATIONS

Catt, "Solution for optimizing connection management based on NWDAF output", 3GPP TSG-SA WG2 Meeting #128bis, Aug. 20-24, 2018, S2-188197, 3 pages.
(Continued)

*Primary Examiner* — Michael Y Mapa (57) ABSTRACT

A communication technique of integrating a 5th generation (5G) or pre-5G communication system for supporting a higher data transmission rate after a 4th generation (4G) communication system such as long term evolution (LTE) with an IoT technology, and a system thereof. The disclosure may be applied to an intelligent service (for example, a smart home, a smart building, a smart city, a smart car, or a connected car, health care, digital education, retails, security and a safety related service, and the like) based on the 5G communication technology and the IoT related technology. According to various embodiments, a device and a method for optimizing mobile initiated communication only (MICO) mode related parameter values for reducing power consumption of a terminal in a mobile communication system.

20 Claims, 6 Drawing Sheets

(51) Int. Cl.
*H04W 16/18* (2009.01)
*H04W 76/27* (2018.01)
*H04W 24/02* (2009.01)
*H04W 8/22* (2009.01)
*H04W 84/04* (2009.01)
*H04W 88/02* (2009.01)

(52) U.S. Cl.
CPC ........... *H04W 24/02* (2013.01); *H04W 60/00* (2013.01); *H04W 76/27* (2018.02); *H04W 84/042* (2013.01); *H04W 88/02* (2013.01)

(58) Field of Classification Search
CPC ..... H04W 88/02; H04W 84/042; H04W 8/18; H04W 8/06; H04W 60/02; H04W 52/02; Y02D 30/70
USPC .................................... 455/435.1, 450–452.2
See application file for complete search history.

(56) References Cited

OTHER PUBLICATIONS

5G; Procedures for the 5g System (3gpp ts 23.502 version 15.2.0 Release 15), ETSI TS 123 502 v15.2.0, (Jun. 2018), 311 pages.
Huawei et al., "Update of Solution 26: Expected UE Behaviour provisioning for CIoT", 3GPP TSG-SA WG2 Meeting #128, Jul. 2-6, 2018, S2-187268, 6 pages.
International Search Report dated Jan. 31, 2020 in connection with International Patent Application No. PCT/KR2019/013077, 3 pages.
Supplementary European Search Report dated Jul. 28, 2021, in connection with European Application No. 19869702.1, 22 pages.
Catt, "Solution for optimizing connection management based on NWDAF output," S2-186908, 3GPP TSG-SA WG2 Meeting #128, Vilnius, Lithuania, Jul. 2-6, 2018, 3 pages.
Huawei, et al., "Solution updates and interim conclusion for Key issue #4 Track 2," S2-188429 (revision of S2-188177), SA WG2 Temporary Document, 3GPP TSG-SA WG2 Meeting #128bis, Sophia, Antipolis, France, Aug. 20-24, 2018, 9 pages.
Nokia, et al., "23.501: Editorial corrections and EN Removal," S2-179096 (revision of S2-17xxxx), SA WG2 Meeting #124, Reno, Nevada, USA, Nov. 27-Dec. 1, 2017, 159 pages.
Orange, et al., "Updates of Solution #2," S2-187943, 3GPP TSG-SA Meeting #128bis, Sophia, Antipolis, France, Aug. 20-24, 2018, 4 pages.
Office Action dated Oct. 20, 2022 in connection with Indian Patent Application No. 202137011264, 8 pages.
European Patent Office, "Communication pursuant to Article 94(3) EPC," dated Jun. 7, 2023, in connection with European Patent Application No. 19869702.1, 22 pages.
3GPP TR 23.791 V1.0.0 (Sep. 2018) Technical Report; 3rd Generation Partnership Project; Technical Specification Group Services and System Aspects; Study of Enablers for Network Automation for 5G (Release 16); 66 pages.
3GPP TR 23.791 V1.1.0 (Oct. 2018) Technical Report; 3rd Generation Partnership Project; Technical Specification Group Services and System Aspects; Study of Enablers for Network Automation for 5G (Release 16); 102 pages.

* cited by examiner

EFFICIENT MICO MODE MANAGEMENT METHOD UTILIZING NETWORK ANALYSIS INFORMATION IN 5G MOBILE NETWORK SYSTEM

CROSS-REFERENCE TO RELATED APPLICATIONS

This application is a continuation of U.S. patent application Ser. No. 16/593,922 filed on Oct. 4, 2019, which is based on and claims priority under 35 U.S.C. 119 to Korean Patent Application No. 10-2018-0119025 filed on Oct. 5, 2018 in the Korean Intellectual Property Office, the disclosures of which are herein incorporated by reference in their entirety.

BACKGROUND

1. Field

The disclosure relates to a device and a method for utilizing a network data analytics function to increase efficiency when a mobile initiated communication only (MICO) function for reducing power consumption of a terminal is managed in a 5G mobile network system.

2. Description of Related Art

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, technologies such as evolved small cell, advanced small cell, cloud Radio Access Network (RAN), ultra-dense network, Device-to-Device communication (D2D), wireless backhaul, moving network, cooperative communication, Coordinated Multi-Points (CoMP), and received interference cancellation have been developed in order to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and has further developed advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Various embodiments suggest a device and a method, in which parameters that are used for managing an MICO mode are optimized and applied in consideration of the current network and service situation according to a situation of a terminal and the kinds of usable services in a 5G mobile network system.

The technical subjects pursued in the disclosure may not be limited to the above mentioned technical subjects, and other technical subjects which are not mentioned may be clearly understood, through the following descriptions, by those skilled in the art of the disclosure.

A method in a 5G mobile network system according to some embodiments includes: an operation of collecting a network and service information from network functions (NFs), external servers (an AF and a service server), a terminal, a 5G network management system (operation, administration, and management (OAM)) by a NEDAF; an operation of determining whether an MICO mode is used by a request of a terminal by an AMF; an operation of requesting network analysis information from the NWDAF to calculate MICO mode related parameters by the AMF; an operation of calculating the MICO mode related parameters by the AMF; an operation of activating a terminal MICO mode by applying the MICD mode related parameters by the AMF; and an operation of supporting a terminal that entered the MICO mode by a network.

Various embodiments include a device and a method for optimizing MICO mode related parameter values for reducing power consumption of a terminal in a mobile communication system.

Various embodiments include a procedure and a method for searching for an optimum value for MICO mode related parameters by using a technique such as artificial intelligence or mechanical learning on the basis of various objects provided by NWDAF, by an AMF.

A device and a method according to various embodiments can minimize loss of data and degradation of service quality, which may be generated in reception of a service, by adjusting a service cut-off period, which may be generated when a terminal that employs a 5G mobile network system uses an MICO mode to reduce consumption of electric power, in consideration of the provided service and the characteristics of the terminal.

According to an embodiment, degradation of service quality due to entrance to an MICO mode can be prevented, and power consumption of a terminal can be remarkably reduced.

Effects obtainable from the disclosure may not be limited to the above mentioned effects, and other effects which are not mentioned may be clearly understood, through the following descriptions, by those skilled in the art of the disclosure.

In accordance with an aspect of the present disclosure, a method of a first network entity for an access and mobility management function (AMF) is provided. The method comprises receiving, from a terminal, a first message for requesting a registration of the terminal, the first message comprises information for indicating preference for mobile initiated communication only (MICO) mode of the terminal; transmitting, to a second network entity for a network data analytics function (NWDAF), a second message for requesting analytics information on the terminal; receiving, from the second network entity, a third message including analytics information on the terminal; and determining whether the MICO mode is allowed for the terminal based on the analytics information on the terminal.

In one embodiment, the analytics information comprises at least one of terminal communication analytics, terminal mobility analytics, and expected UE behavioral parameters.

In one embodiment, the method further comprises transmitting, to the terminal, a fourth message as a response to the first message including information indicating whether the MICO mode is allowed for the terminal.

In one embodiment, the method further comprises determining MICO mode parameters based on the analytics information on the terminal.

In one embodiment, the MICO mode parameters include at least one of information on an extended connected time for indicating a base station to keep the terminal in radio resource connection (RRC) connected state, information on an active time for indicating the terminal to enter the MICO mode when the active time expires, or information on a periodic registration timer for the terminal to perform a periodic registration.

In one embodiment, the second message further includes information on the terminal or a group of terminals.

The present disclosure also provides a method of a first network entity for a network data analytics function (NWDAF). The method comprises receiving, from a second network entity for an access and mobility management function (AMF), a first message for requesting analytics information on a terminal; and transmitting, to the second network entity, a second message including analytics information on the terminal.

In one embodiment, the first message further includes information on the terminal or a group of terminals.

In one embodiment, the method further comprises transmitting, to a third network entity, a third message for requesting to subscribe to an event for the terminal for notification of the event occurs; receiving, from the third network entity, a fourth message including information associated with the event; determining the analytics information on the terminal based on the fourth message; and transmitting, to the second network entity, the second message including the analytics information on the terminal.

The present disclosure also provides a first network entity for an access and mobility management function (AMF). The first network entity comprises a transceiver; and a controller configured to receive, from a terminal, a first message for requesting a registration of the terminal, the first message comprises information for indicating preference for mobile initiated communication only (MICO) mode of the terminal, transmit, to a second network entity for a network data analytics function (NWDAF), a second message for requesting analytics information on the terminal, receive, from the second network entity, a third message including analytics information on the terminal, and determine whether the MICO mode is allowed for the terminal based on the analytics information on the terminal.

The present disclosure also provides a first network entity for a network data analytics function (NWDAF). The first network entity comprises a transceiver; and a controller configured to receive, from a second network entity for an access and mobility management function (AMF), a first message for requesting analytics information on a terminal; and transmit, to the second network entity, a second message including analytics information on the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments disclosed below, but may be implemented in various forms. The embodiments are provided to make the disclosure of the disclosure complete and fully inform those skilled in the art to which the disclosure pertains of the scope of the disclosure. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~ unit' may include one or more processors.

While main targets are a wireless connection network new RAN (NR) on the 5G mobile communication standards, which are suggested by 3GPP that is a mobile communication standardization group, and a pack core (a 5G system, a 5G core network, or a next generation (NG) core) that is a core network in a detailed description of the embodiments, the main essences of the disclosure may be applied to other communication systems having a similar technical background in various modifications without greatly departing from the scope of the disclosure, and can be made possible by the determination of an ordinary person in the art to which the disclosure pertains.

Hereinafter, terms and names defined by the 3rd generation partnership project (3GPP) long term evolution standards (5G, NR, LTE, or standards of the similar systems) may be partially used for convenience of description. However, the disclosure may not be limited by the terms and names, and may be equally applied to a system that is based on another standard.

The terms for identifying connection nodes, the terms that refer to network entities, the terms that refer to messages, the terms that refer to interfaces between the network entities, the terms that refer to various identification information, and the like, which are used in the following description, are exemplified for convenience of description. Accordingly, the terms used in the disclosure are not limited, and other terms that refer to objects having the equivalent technical meaning may be used.

The disclosure relates to a method for optimizing related parameters by utilizing an NWDAF when an access and mobility function (AMF), which manages an access and a mobility of the 5G mobile communication network of a terminal in a 5G mobile communication system, activates an MICO mode that allows the terminal only to initiate communication first by a request of the terminal.

The 5G mobile communication system defined a network data collection and analysis function (NWDAF) that provides a function of analyzing data collected by the 5G network and providing the collected data to support network automation. The NWDAF may collect, store, and analyze information from the 5G network to provide the result to an unspecific network function (NF), and the analysis result may be independently used by the NFs. The NWDAF may collect and analyze network information while taking network slices as basic units. However, the scope of the disclosure is not limited to the network slice units, and the NWDAF may additionally use various information, such as a user equipment (UE), a PDU session, and an NF state. The result analyzed by the NWDAF is delivered to the NFs that requested the result, and the delivered analysis result may be used to optimize network management functions, such as securement/enhancement of quality of service (QoS), traffic control, mobility management, and load dispersion.

The entities that appear in the disclosure may be described in the following.

Figure 1:
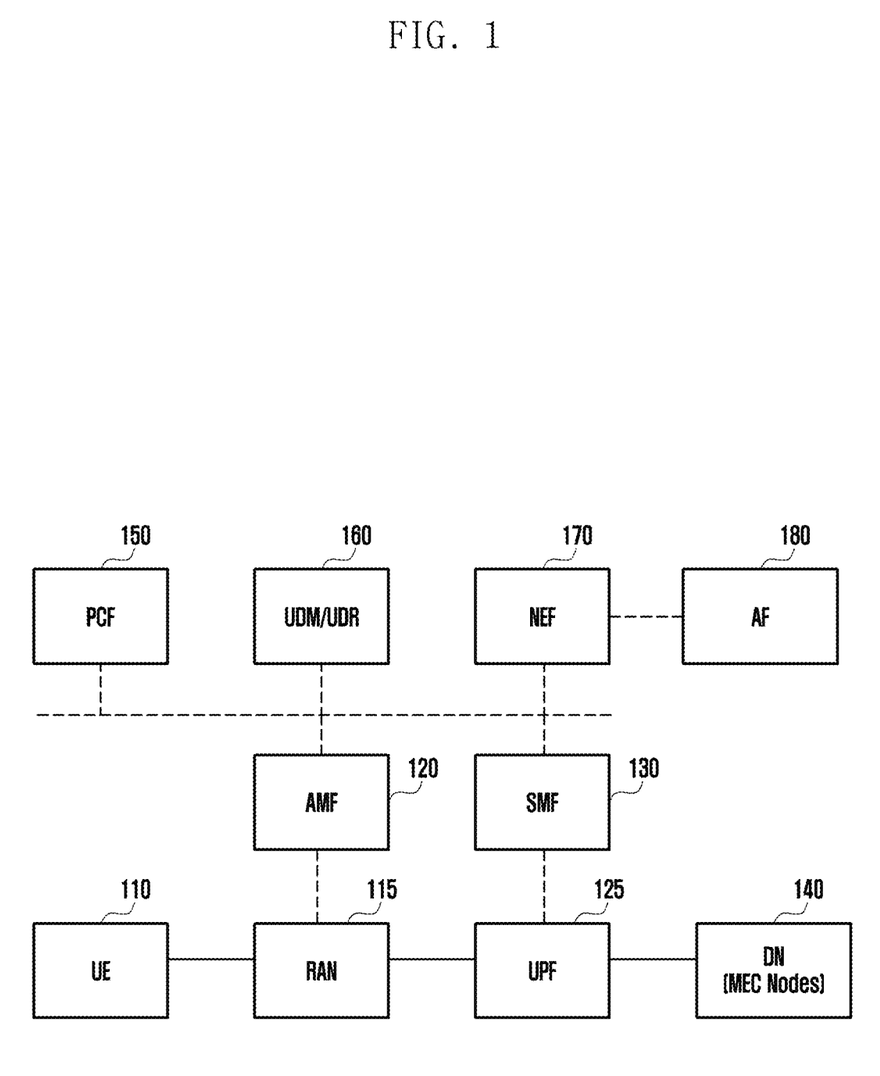
FIG. 1 illustrates a network structure and an interface in a wireless communication system according to various embodiments.

FIG. 1 illustrates a network structure and an interface in a wireless communication system according to various embodiments.

The units that perform various functions provided by a 5G network system may be defined as a network function (NF). The structure of the 5G mobile communication network is illustrated in FIG. 1. Representative NFs include an access and mobility management function (AMF) 120 that manages the network access and the mobility of a user equipment (UE) 110, a session management function (SMF) 130 that performs a function related to a session, a user plane function (UPF) 125 that functions to deliver user data, an application function (AF) 180 that communicates with a 5GC for provision, a network exposure function (NEF) 170 that supports communication between the 5GC and the AF 180, a unified data management (UDM) and unified data repository (UDR) 160 for storing and managing data, a policy and control function (PCF) 150 for managing a policy, and a data network (DN) 140, such as an internet through which user data are delivered. In addition to the NFs, an operation, administration, and management (OAM) (not illustrated) that is a system for managing a terminal and a 5G mobile communication network may be present.

A network data analytics function (NWDAF) (not illustrated), which is an NF that aims to collect and analyze data, may be present. The NWDAF functions to analyze information collected from a network or the outside and provide the analysis result to the NF. The NWDAF may collect information from an NF or an AF that constitutes an OAM or a 5G network. The NWDAF may collect information in various methods. The representative analysis function of the NWDAF is to collect and analyze the load level of a network slice instance and provide the result to another NF to be used to select a specific UE 110 such that the specific UE 110 may be used. A service based interface defined by the 5G network is used in requesting analysis information or deliver the analysis result between a specific NF and the NWDAF.

In the 5G network, the NWDAF may provide the following services that provide a function of collecting and analyzing information. Of course, the disclosure is not limited to the following examples.

Nnwdaf_EventsSubscription Service: The event subscription service is for subscription and unsubscription of an event generated by the NWDAF, and the event subscription service may be classified into methods for receiving events periodically or when a specific condition is satisfied. The event subscription service is referred to as Nnwdaf_EventsSubscription. The Nnwdaf_EventsSubscription service provides three operations of subscription, unsubscription, and notification.

When a specific NF wants a subscription (Nnwdaf_EventsSubscription Subscribe), a parameter delivered by the specific NF through the NWDAF may be classified into a required input parameter and an optional input parameter. According to some embodiments, a required input may include S-NSSAI (single network slice selection assistance information), an event identifier, a notification target address, and event reporting information. Of course, the disclosure is not limited to the examples. According to some embodiments, the optional input may include information that is additionally used for analysis information process, and may representatively include event filter information. Of course, the disclosure is not limited to the examples.

As an essential input for Nnwdaf_EventsSubscription_Unsubscribe, the NF delivers subscription identifier information to the NWDAF, and the NWDAF delivers the full text that notifies, as an output, that the release of subscription has been identified to the NF that requested an operation.

The Nnwdaf_EventsSubscription_Notify is to notify, when the NWDAF satisfies a periodic or specific condition, the result to an NF that is successfully subscribing a specific event, for the specific event. Essential input information of the notification operation may include an event identifier, a notification target address, an identifier of a network slice instance, and the load level information of a network slice instance, and essential output information may not be present. Of course, the disclosure is not limited to the above examples.

An Nnwdaf_Analytics_Info service: Unlike the above-described event subscription service, an analysis request service may mean a service in which, after the NF requests analysis of specific information, a result value is delivered immediately after the request is completed. An operation of supporting by the analysis information request service includes a request and a response. The NF that requests analysis information may send an analysis information request to the NWDAF.

Generally, the NF sends, as essential inputs of the analysis information request, load level information of a network slice instance, an analytic ID, and additional parameters that are used for an analysis to the NWDAF. The NWDAF sends the analysis result to the NF when receiving a request from the NF. Load information of the requested slice is sent in the response.

While the analysis information provided through the service provided by the NWDAF considers only load information of the instance of the network slice according to the current Rel-15 definition of the 3GPP, the information provided by the NWDAF is not limited only to the load information in the disclosure.

The disclosure includes expansion/modification of the above-described interface of the NWDAF, and includes a method for analyzing a UE behavioral pattern provided by the AF and an external provisioned parameter as well as network slice information between the NWDAF and the AMF, and inferring information that is not present or calculating an error rate of existing information through the data collected by the NWDAF to provide the inferred information or the error rate to the AMF or another NF. Moreover, the NWDAF may include a method for providing set parameters used for the MICO mode as recommended values.

In the disclosure, the AMF includes an embodiment of calculating a periodic registration that is a parameter related to the MICO mode usable for reduction of the electric power of the terminal, a minimal reachability maintain time before initiation of the MICO mode, and the size and time of a buffer that is used for the MICO mode. The disclosure aims to prevent degradation of service quality and maintain the power consumption of the terminal low by minimizing the values of the parameters according to the user usage pattern of the terminal and the form of the service by utilizing the NWDAF.

Whether the terminal may use the MICO mode in the existing 3GPP is determined by the AMF according to the internal policy of the service provider that manages the 5G network. In order to allow the terminal that may utilize the MICO mode to activate the MICO mode, a MICO mode preference is transmitted together in the registration process, and the AMF that received the MICO mode preference sends a MICO indication in a registration accept message. The terminal that is informed that the MICO mode may be initiated may initiate the MICO mode in a CM_IDLE state. The terminal may deliver the MICO mode preference during an initial registration and a registration update process, and may deliver whether the MICO mode is possible to the terminal through a registration accept message sent by the AMF and a set configuration update procedure. Thereafter, the terminal that is notified of whether the MICO mode is possible by the AMF initiates the MICO mode, and then, may not listen to all signals generated from the network. The terminal should wake up at the next periodic registration time point and inform the AMF that the terminal is registered in the network through a registration update procedure. That is, the MICO mode initiation time point and the wakeup time point of the terminal are determined according to the registration update period. The disclosure includes finding an optimum value between data loss and degradation of service quality according to battery consumption of the terminal and data transmission by adjusting the registration period of the terminal.

In the MICO mode, a method capable of delivering data to the terminal until the terminal wakes up again is not present because the terminal does not listen to all signals generated in the 5G network after the terminal initiates the MICO mode due to the characteristics thereof. Accordingly, when data that are to be delivered from the outside to the terminal is scheduled in the near future, it is necessary to maintain the accessibility of the terminal. Here, the accessibility refers to a state in which the terminal may be provided with a network service through a call of the AMF, and both of CM_IDLE and CM_CONNECTED may correspond to the accessibility. Currently, the 3GPP has two methods for applying a minimum time period, for which the accessibility has to be maintained, before the terminal initiates the MICO mode. The first is a method for utilizing a connected time value that refers to a minimum time period only when the AMF maintains the RAM in an RRC CONNECTED state. The second is a method for utilizing an active timer that means a standby time period from the initiation of a CM_IDLE mode to the initiation of the MICO mode when the UE (terminal) is registered in the network. Both of the two methods are methods for guaranteeing the accessibility of the terminal for a specific period of time before the terminal initiates the MICO mode. Accordingly, the terminal has to be made to initiate the MICO mode as quickly as possible such that there is no loss or delay of data by optimizing the period of time, for which the terminal waits before the initiation of the MICO mode.

Data cannot be delivered after the terminal initiates the MICO mode, and the basic operation then is to drop data packets. However, if the number and the size of the data packets that is to be received until the terminal wakes up the next time is known, data may be transferred without loss of data by buffering downstream data by an SMF or a UPF. It is necessary to determine whether downstream data packets come in a level at which buffering is possible, and analyze the time period for buffering and the size and the number of the data that are to be buffered.

The AMF may utilize external provisioned parameters that are received from the AF to derive the MICO mode related set parameters. As communication pattern parameters, the representative external parameters include a network configuration parameter, an expected UE trajectory, and an expected UE behavioral pattern. In the disclosure, the external parameters are not explicitly defined as a set of specific parameters, and refer to parameters that are received from an external AF.

In order to determine the MICO mode related parameters, the current AMF determines values by performing a calculation algorithm of its own through the data collected by itself and the external parameters received from the AF. While the determination method for the values may vary according to implementation of the AMF, the analysis data that may be collected by the AMF is limited according to the definition of the 3GPP standards and thus it is difficult to derive an optimum value.

Figure 2:
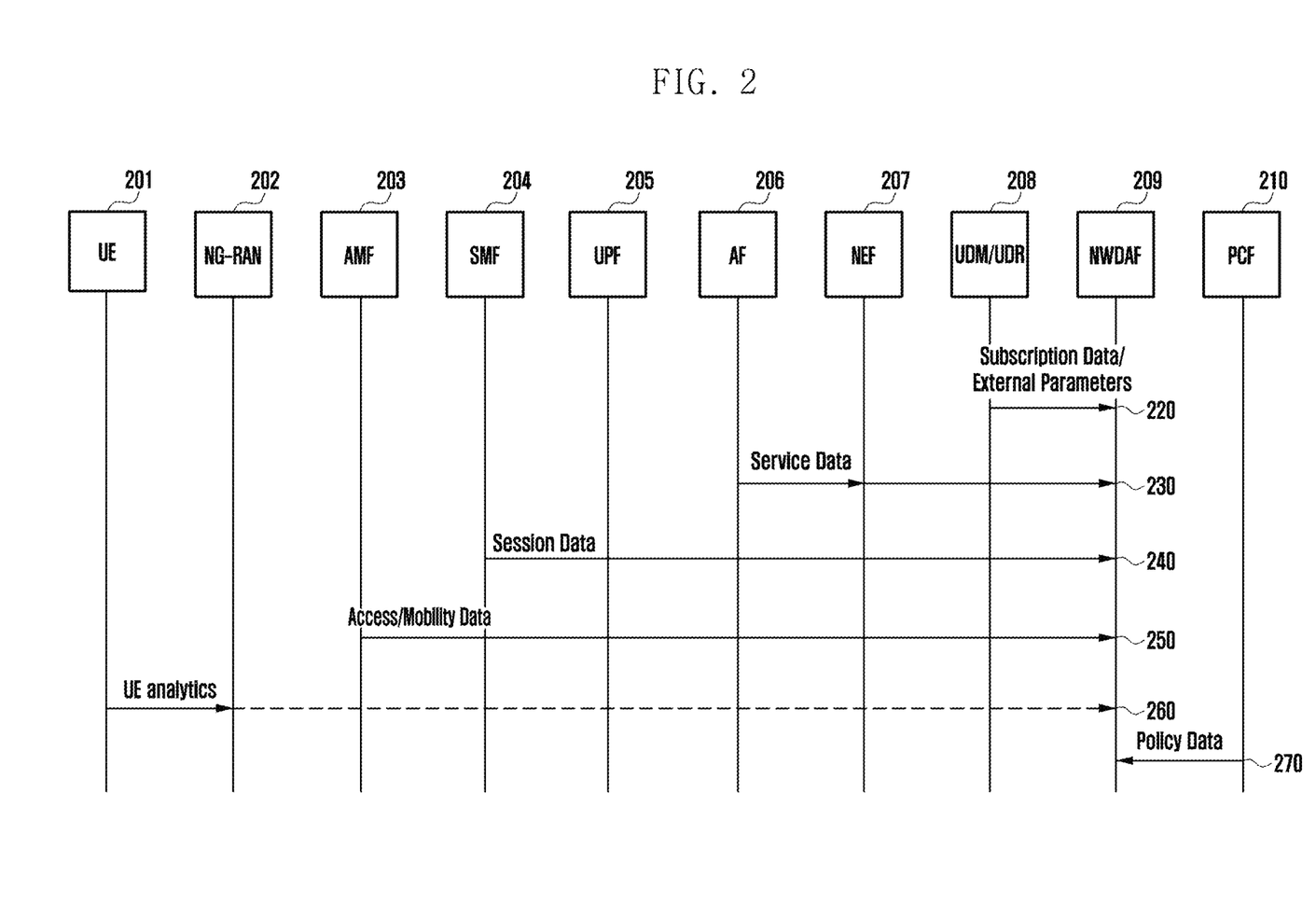
FIG. 2 illustrates a relationship with other objects for collecting data in an NWDAF according to an embodiment.

The disclosure includes a method for optimization of the MICO mode related set value, collecting and analyzing various data and providing the analyzed data to the AMF by the network, the terminal, the AF, and the network management system. The NWDAF collects data from the above entities for collection of data. The data collected from the 5GC NFs are listed in Table 1. The data collected by the terminal that is an external object, the AF, and the network management system is listed in Table 2. The process of collecting data is illustrated in FIG. 2. FIG. 2 illustrates a relationship with other objects for collecting data in an NWDAF according to an embodiment. Referring to FIG. 2, the NWDAF 209 may receive subscription data and/or external parameters from a UDM/UDR 208 (operation 220).

The NWDAF 209 may receive service data from an AF 206 (through an NEF 207) (operation 230). The NWDAF 209 may receive session data from an SMF 204 (operation 240). The NWDAF 209 may receive access/mobility data from an AMF 203 (operation 250). The NWDAF 209 may receive UE analytics from a UE 201 (through a base station (NG-RAN) 202) (operation 260). The NWDAF 209 may receive policy data from a PCF 210 (operation 270). The operations of FIG. 2 do not indicate the generation sequence, and the operations illustrated are not generated in the illustrated sequence. Analysis of the collected data and prediction or analysis of the parameters that are used in the embodiments may vary according to an algorithm and a purpose.

TABLE 1

| Collection information | Collection target | Description |
| --- | --- | --- |
| Application ID | PCF | An ID received from the AF. Used to distinguish service providers of applications and QoS flows to be applied. |
| IP filter information | PCF | Information received from the AF. Used to distinguish service data flows delivered to a specific service. |
| Media/application bandwidth | PCF | Information received from the AF. Bandwidth requirements that require media/applications |
| Location information | AMF | Current location information |
| Data network name | SMF/PCF | Network name that provides a service |
| QoS profile | SMF/PCF | QoS profile information of a terminal |
| Traffic usage report | UPF/SMF | Traffic usage information for UEs |
| Session management policy | PCF | Session related policy |
| Access and mobility policy | PCF | Access and mobility management policy of the terminal |
| Charging policy | PCF | Charging related policy in using a service |
| External parameter | UDM/UDR | Information received from the AF |
| Serving NF registration management information | UDM/UDR | AMF and PDU session information used by the UE according to an internal policy and a past usage record |
| Subscription management information | UDM/UDR | Management information of a subscriber |

TABLE 2

| Collection information | Collection target | Description |
| --- | --- | --- |
| NF resource status | OAM | A status of a resource currently used by an NF and an occupation rate as compared with a maximum value. A target of a resource may include a CPU, a memory, and an I/O (including a network). |
| NF throughput | OAM | A processing situation and a maximum value of a service that is currently processed by the NF. The expression methods of a processing capacity are different according to the purposes of the NFs. |
| Service level agreement (SLA) information | OAM | Contract related information to be provided to a specific service |
| UE status | UE | The kind of a UE and state related information. Representatively, state information such as battery information and external network connection status |

TABLE 2-continued

| Collection information | Collection target | Description |
| --- | --- | --- |
| UE application information | UE | A state of an application program installed in the terminal or being used. |
| UE usage pattern | UE | Usage pattern information of the terminal. Information recognized by the UE and is not limited to network related information. Representatively includes a time at which a specific application is performed, a frequency at which the terminal is used, and period information. |
| Application ID | AF | Identifier information that may be distinguished from an application provided by another AF |
| Service experience | AF | A current service quality level evaluated by a real user or a service distinguisher. Representatively, includes a mean opinion service (MOS) value. |
| Traffic pattern | AF | A traffic pattern designed when an application or a service is developed. |

First Embodiment

In the disclosure, when the AMF receives a registration request including an MICO mode preference from the terminal, the AMF calculates whether the MICO mode of the terminal is accommodated and a periodic registration timer value and sends the result together the registration update message. In addition, the terminal does not initiate the MICO mode immediately after CM_CONNECTED is changed to CM_IDLE but the AMF calculates a minimum time period, for which an accessibility has to be maintained for a specific time period, and delivers the result to the UE or the RAN. Then, the method for applying a communicable state to a maintenance time period follows the standard of the 3GPP. Next, when the SMF receives a signal indicating that downstream data came to the terminal in the MICO mode, the AMF informs the SMF that the terminal cannot be currently accessed and informs of a buffering time and the size of the buffer. Then, the NF that buffers may be the SMF or the UPF, and is operated according to the standards of the 3GPP.

Figure 3:
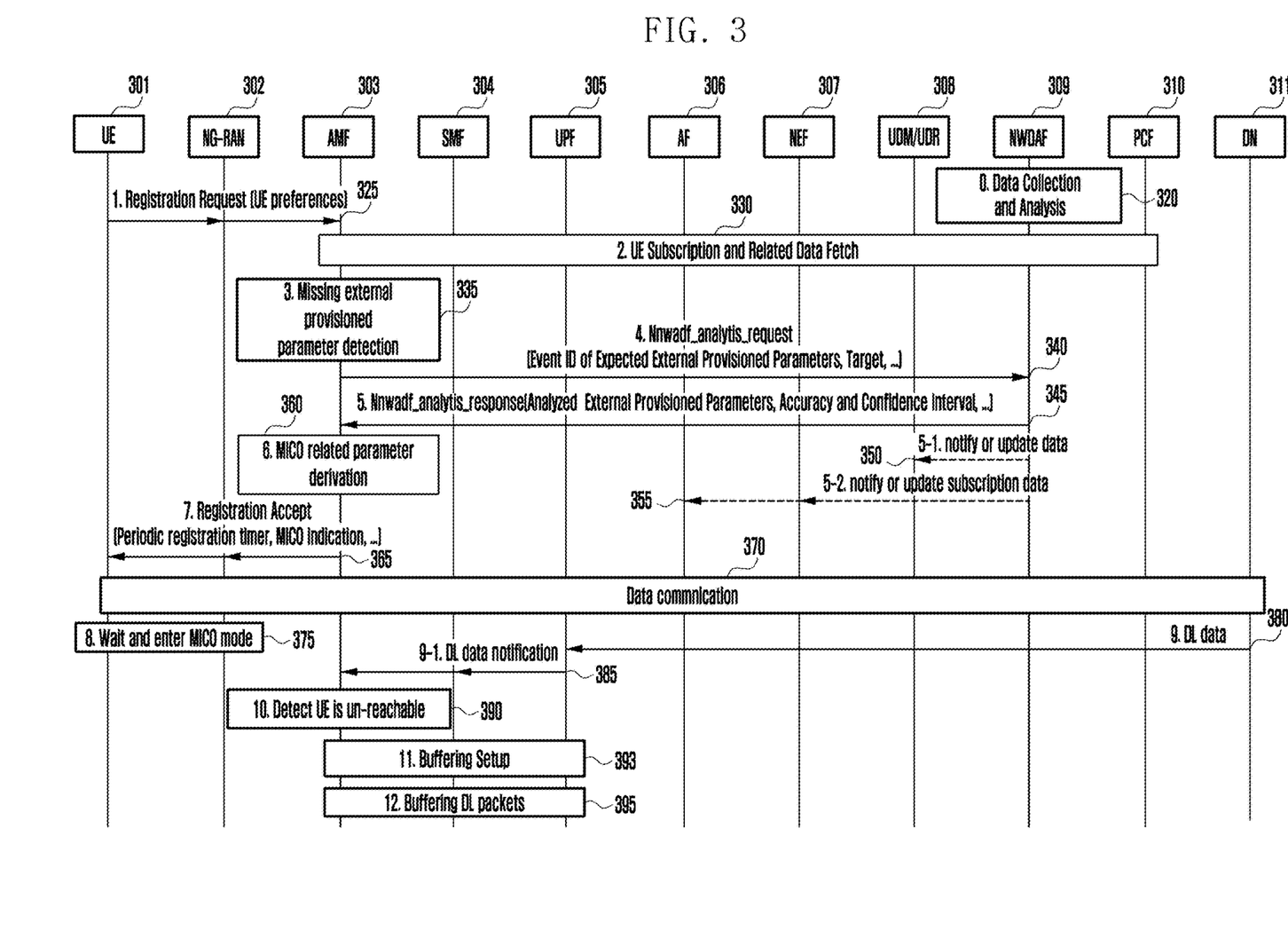
FIG. 3 illustrates a procedure that supports an MICO mode by requesting an external parameter, which has not been delivered by an AMF from the NWDAF, according to an embodiment.

FIG. 3 illustrates a procedure that supports an MICO mode by requesting an external parameter, which has not been delivered by an AMF from the NWDAF, according to an embodiment.

The present embodiment will be discussed with reference to FIG. 3.

In operation 320, the NWDAF 309 collects the above-described data from the NFs 303, 304, 308, 310, and the like, the UE 301, the AF 306, and the OAM (not illustrated) and analyzes the data. The collection of the data follows a procedure in the standards ruled by the 3GPP.

In operation 325, the terminal 301 performs a registration procedure, and when the terminal 301 can activate the MICO mode, writes a MICO mode preference in a registration message according to the internal decision.

In operation 330, the AMF 303 may collect subscription information, access information, mobility information management information, and information for registration of the terminal 301 from the PCF 310 and the UDM/UDR 308. The AMF 303 may bring external parameters stored in the UDM/UDR 308.

In operation 335, in the case in which the MICO mode preference of the terminal 301 is requested when the registration procedure is performed, the AMF 303 detects an MICO mode indication, parameters that are used for determining related parameters, and parameters that are not currently carried. The AMF 303 may receive related external parameters and internal parameters in advance from the AF 306 and the UDR/UDM 308 though the procedure ruled by the 3GPP.

In operation 340, the AMF 303 requests inferred/predicted values of the external parameters, which are not carried by the AMF 303, from the NWDAF 309. The AMF 303 sends an analysis request to the NWDAF 309 while an event ID and a target for the external parameter are taken as a parameter when requested. The AMF 303 may additionally limit the target to a specific terminal, a specific terminal group, a specific network slice, and a specific area and send the limited target.

In operation 345, the NWDAF 309 may calculate an analysis/prediction value of the parameters requested by the AMF 303 and return the calculated value to the AMF 303. The NWDAF 309 may transmit an accuracy or a reliability for the result values together.

In operation 350, (optionally) the NWDAF 309 may renew the UDR/UDM 308 and allow the calculation result value to be used later if the calculated result is not present in the UDR/UDM 308.

In operation 355, (optionally) the NWDAF 309 may send a notification through the NEF 307 and deliver the information to the AF 306 if the calculated result is different from the value received from the AF 306.

In operation 360, the AMF 303 determines a MICO mode indication, a periodic registration timer, a minimal reachable time, and a buffer size and time, which are MICO mode related parameters, by using the received analyzed/predicted parameter values.

In operation 365, the AMF 303 responds to the terminal 301 while a MICO mode indication and a periodic registration timer are included in the registration accept message. When the minimal reachable time is managed by the terminal 301 (e.g., an active timer is used), the minimal reachable time is delivered to the terminal 301 together. When the minimal reachable time is managed by the RAN 302 (e.g., when a connected timer value is used), the minimal reachable time may be delivered to the RAN 302 through an N2 interface.

In operation 370, the terminal 301 uses a 5GC service. Thereafter, in operation 375, the terminal 301 initiates the MICO mode after standing by for a minimal reachable time before initiating the MICO mode.

In operation 380, downstream data from the outside 311 to the terminal 301 may be generated.

In operation 385, the SMF 304 sends a call request to the AMF 303.

In operation 390, after identifying that the terminal 301 initiated the MICO mode, the AMF 303 determines the buffer size by predicting a time at which the terminal 301 wakes up the next time.

In operation 393, the AMF 303 sends the determined buffer size in response to the SMF 304. The location at which the packets are buffered follows the standards of the 3GPP.

In operation 395, downstream packets of the terminal 301 in the MICO mode are buffered at a location at which the packets according to the 3GPP standards are buffered.

Second Embodiment

The disclosure is a method for, when external parameters are received in advance from the AF or the UDM/UDR, identifying the healthiness of the received parameters in the first embodiment. The AF may set an arbitrary value or a too large or small value due to lack of clear understanding of a communication pattern of a service. This is for preventing the MICO mode related parameter(s) from failing to be optimized due to the operation. The present embodiment may be used together with the first embodiment.

Figure 4:
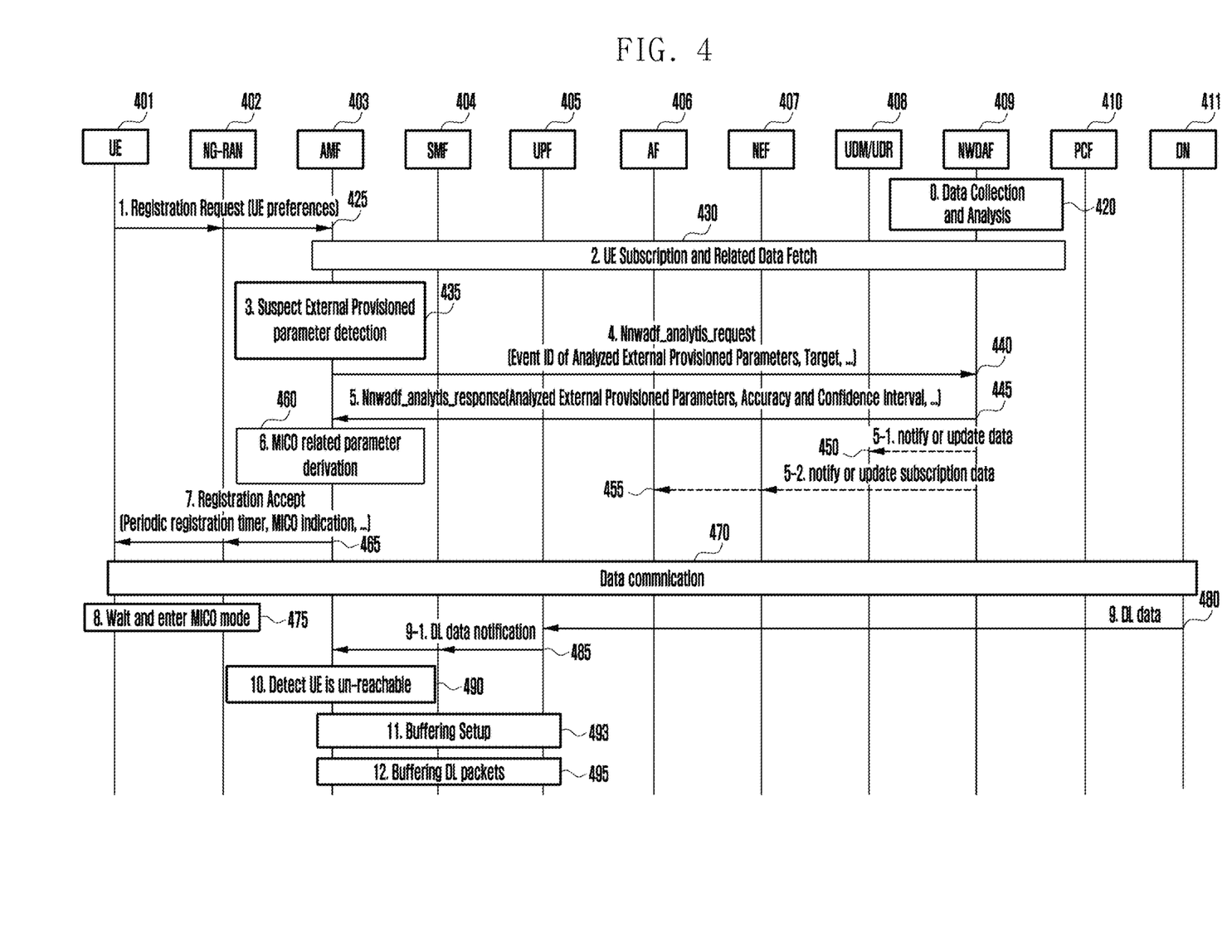
FIG. 4 illustrates a procedure that supports the MICO mode by requesting an error analysis of an external parameter, which has been delivered by the AMF from the NWDAF, according to an embodiment.

FIG. 4 illustrates a procedure that supports the MICO mode by requesting an error analysis of an external parameter, which has been delivered by the AMF from the NWDAF, according to an embodiment.

The present embodiment will be discussed with reference to FIG. 4.

In operation 420, the NWDAF 409 is collecting the above-described data from the NFs 403, 404, 408, 410, and the like, the UE 401, the AF 406, and the OAM (not illustrated) and is analyzing the data. The collection of the data follows a procedure in the standards ruled by the 3GPP.

In operation 425, the terminal 401 performs a registration procedure, and when the terminal 401 can activate the MICO mode, writes a MICO mode preference in a registration message according to the internal decision.

In operation 430, the AMF 403 may collect subscription information, access information, mobility information management information, and information for registration of the terminal 401 from the PCF 410 and the UDM/UDR 408. The AMF 403 may bring external parameters stored in the UDM/UDR 408.

In operation 435, in the case in which the MICO mode preference of the terminal 401 is requested when the registration procedure is performed, the AMF 403 detects an MICO mode indication, parameters that are used for determining related parameters, and parameters that are not currently carried. The AMF 403 may receive related external parameters and internal parameters in advance from the AF 406 and the UDR/UDM 408 though the procedure ruled by the 3GPP.

In operation 440, the AMF 403 requests analysis values from the NWDAF 409 to recognize errors of the external parameters, which are currently carried by the AMF 403. The AMF 403 sends an analysis request while an event ID and a target for the external parameter are taken as a parameter when requested. The AMF 403 may additionally limit the target to a specific terminal, a specific terminal group, a specific network slice, and a specific area and send the limited target.

In operation 445, the NWDAF 409 may calculate an analysis/prediction value of the parameters requested by the AMF 403 and return the calculated value to the AMF 403. The NWDAF 409 may transmit an accuracy or a reliability for the result values together.

In operation 350, (optionally) the NWDAF 409 may renew the UDR/UDM 408 and allow the calculation result value to be used later if the calculated result is not present in the UDR/UDM 408. The UDR/UDM 408 may simultaneously store the value received from the AF 406 and the analyzed value, or may express an error value of the received value.

In operation 355, (optionally) the NWDAF 409 may send a notification through the NEF 407 and deliver the information to the AF 406 if the calculated result is not received from the AF 406.

In operation 460, the AMF 403 determines a MICO mode indication, a periodic registration timer, a minimal reachable time, and a buffer size and time, which are MICO mode related parameters, by correcting the received analyzed/predicted parameter values.

In operation 465, the AMF 403 responds to the terminal 401 while a MICO mode indication and a periodic registration timer are included in the registration accept message. When the minimal reachable time is managed by the terminal 401 (e.g., an active timer is used), the minimal reachable time is delivered to the terminal 401 together. When the minimal reachable time is managed by the RAN 402 (e.g., when a connected timer value is used), the minimal reachable time may be delivered to the RAN 402 through an N2 interface.

In operation 470, the terminal 401 uses a 5GC service. Thereafter, in operation 475, the terminal 401 initiates the MICO mode after standing by for a minimal reachable time before initiating the MICO mode.

In operation 480, downstream data from the outside 411 to the terminal 401 may be generated.

In operation 485, the SMF 404 sends a call request to the AMF 403.

In operation 490, after identifying that the terminal 401 initiated the MICO mode, the AMF 403 determines the buffer size by predicting a time at which the terminal 401 wakes up the next time.

In operation 493, the AMF 403 sends the determined buffer size in response to the SMF 404. The location at which the packets are buffered follows the standards of the 3GPP.

In operation 495, downstream packets of the terminal 401 in the MICO mode are buffered at a location at which the packets according to the 3GPP standards are buffered.

Third Embodiment

The disclosure is a case in which the AMF receives an MICO mode indication, a periodic registration timer, a minimal reachable time, and a buffer size and time, which are MICO mode related parameters, from the NWDAF in the form of a recommended value. The AMF functions to trust the determination of the MICO mode related parameter(s) to the NWDAF or monitor an allowable range of the values.

Figure 5:
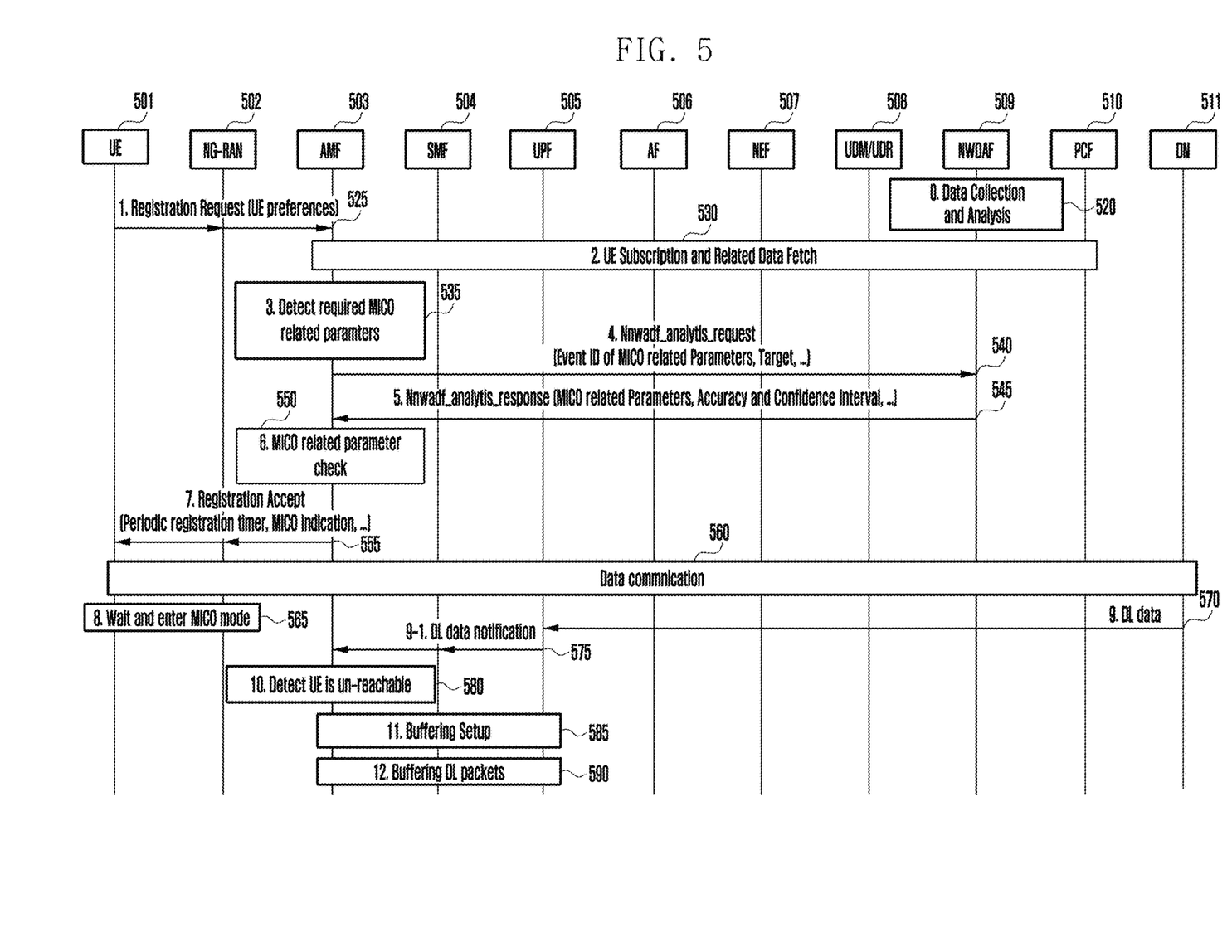
FIG. 5 illustrates a procedure that supports the MICO mode by requesting a recommendation value for a MICO mode related parameter, which has not been delivered by the AMF from the NWDAF, according to an embodiment.

FIG. 5 illustrates a procedure that supports the MICO mode by requesting a recommendation value for a MICO mode related parameter, which has not been delivered by the AMF from the NWDAF, according to an embodiment.

The present embodiment will be discussed with reference to FIG. 5.

In operation 520, the NWDAF 509 is collecting the above-described data from the NFs 503, 504, 508, 510, and the like, the UE 501, the AF 506, and the OAM (not illustrated) and is analyzing the data. The collection of the data follows a procedure in the standards ruled by the 3GPP.

In operation 525, the terminal 501 performs a registration procedure, and when the terminal 501 can activate the MICO mode, writes a MICO mode preference in a registration message.

In operation 530, the AMF 503 may collect subscription information, access information, mobility information management information, and information for registration of the terminal 501 from the PCF 510 and the UDM/UDR 508. The AMF 503 may bring external parameters stored in the UDM/UDR 508.

In operation 535, in the case in which an MICO mode preference of the terminal 501 is requested when a registration procedure is performed, the AMF 503 detects that it is necessary to determine an MICO mode indication and calculate related parameters.

In operation 540, the AMF 503 requests a recommended value of the MICO mode related parameter(s) from the NWDAF 509. The AMF 503 sends an analysis request while event IDs and targets for the MICO mode related parameter are taken as parameters when requested. The AMF 503 may additionally limit the target to a specific terminal, a specific terminal group, a specific network slice, and a specific area and send the limited target. Then, the MICO mode related parameter(s) is not limited to an MICO mode indication, a periodic registration timer, a minimal reachable time, and a buffer size and time.

In operation 545, the NWDAF 509 may calculate an analysis/prediction value of the parameters requested by the AMF 503 and return the calculated value to the AMF 503. The NWDAF 509 may transmit an accuracy or a reliability for the result values together.

In operation 550, the AMF 503 reviews the received analyzed/predicted parameter values, and determines whether a MICO mode indication, a periodic registration timer, a minimal reachable time, and a buffer size and time, which are MICO mode related parameters, by using the received analyzed/predicted parameter values are to be applied.

In operation 555, the AMF 503 responds to the terminal 501 while a MICO mode indication and a periodic registration timer are included in the registration accept message. When the minimal reachable time is managed by the terminal 501 (e.g., an active timer is used), the minimal reachable time is delivered to the terminal 501 together. When the minimal reachable time is managed by the RAN 502 (e.g., when a connected timer value is used), the minimal reachable time may be delivered to the RAN 502 through an N2 interface.

In operation 560, the terminal 501 uses a 5GC service. Thereafter, in operation 565, the terminal 501 initiates the MICO mode after standing by for a minimal reachable time before initiating the MICO mode.

In operation 570, downstream data from the outside 511 to the terminal 501 may be generated.

In operation 575, the SMF 504 sends a call request to the AMF 503.

In operation 580, after identifying that the terminal 503 initiated the MICO mode, the AMF 501 determines the buffer size by predicting a time at which the terminal 501 wakes up the next time.

In operation 585, the AMF 503 sends the determined buffer size in response to the SMF 504. The location at which the packets are buffered follows the standards of the 3GPP.

In operation 590, downstream packets of the terminal 401 in the MICO mode are buffered at a location at which the packets according to the 3GPP standards are buffered.

A method in a 5G mobile network system according to the above-described embodiments includes: * an operation of collecting a network and service information from network functions (NFs), external servers (an AF and a service server), a terminal, a 5G network management system (operation, administration, and management (OAM)) by a NEDAF; an operation of determining whether an MICO mode is used by a request of a terminal by an AMF; an operation of requesting network analysis information from the NWDAF to calculate MICO mode related parameters by the AMF; an operation of calculating the MICO mode related parameters by the AMF; an operation of activating a terminal MICO mode by applying the MICD mode related parameters by the AMF; and an operation of supporting a terminal that entered the MICO mode by a network. According to various embodiments, a device and a method for optimizing MICO mode related parameter values for reducing power consumption of a terminal in a mobile communication system may be provided. Various embodiments may provide a procedure and a method for searching for an optimum value for MICO mode related parameters by using a technique such as artificial intelligence or mechanical learning on the basis of data collected from various objects provided by the NWDAF.

Figure 6:
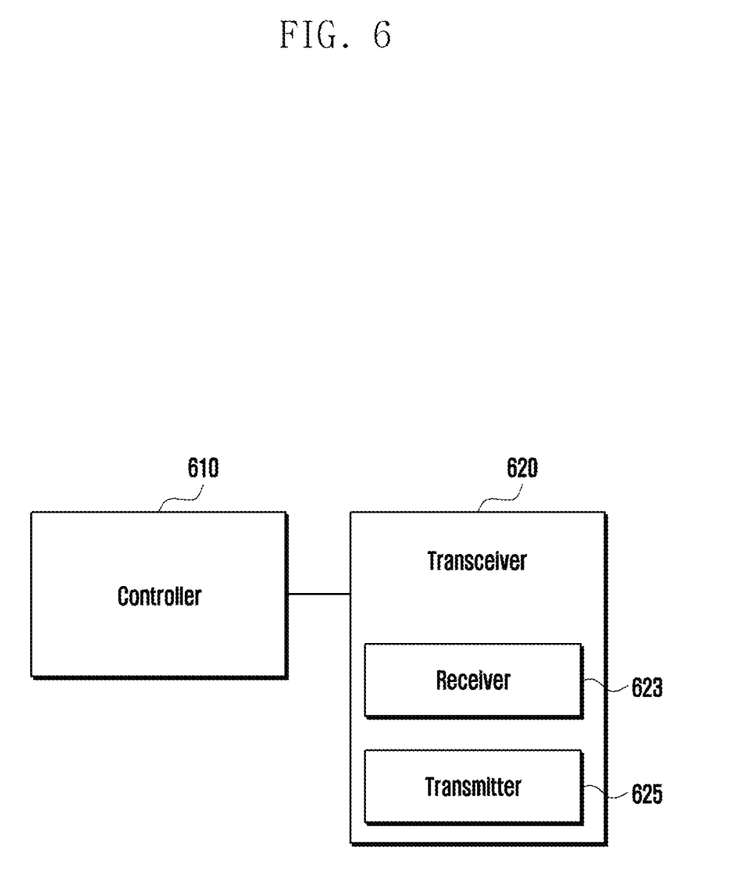
FIG. 6 illustrates a view of a configuration of a network entity according to an embodiment.

FIG. 6 illustrates a view of a configuration of a network entity according to an embodiment.

The network entity according to an embodiment may include a transceiver 620 and a controller that controls an overall operation of the network entity. The transceiver 620 may include a transmitter 623 and a receiver 625.

The transceiver 620 may transmit and receive signals to and from other network entities.

The controller 610 may control the network entity to perform any one operation of the above-described embodiments. The controller 610 and the transceiver 620 are not necessarily realized as separate modules, and it is apparent that they may be realized by one configuration in a form such as a single chip. The controller 610 and the transceiver 620 may be electrically connected to each other. For example, the controller 610 may be a circuit, an application-specific circuit, or at least one processor. The operations of the network entity may be realized by providing a memory device storing the corresponding program codes in an arbitrary configuration in the network entity.

The network entity may be a terminal, AMF, NWDAF, RN-RAN, SMF, UPF, AF, NEF, UDM/UDR, PCF, and DN.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) in a wireless communication system, the method comprising:
receiving, from a terminal, a registration request message including first information for indicating preference for mobile initiated communication only (MICO) mode of the terminal;
transmitting, to a network data analytics function (NWDAF), an analytics information request message including an analytics identification (ID) for identifying analytics information for the terminal requested by the AMF and information on the terminal or a group of terminals;
receiving, from the NWDAF, an analytics information response message including the analytics information for the terminal requested by the AMF, wherein the analytics information for the terminal requested by the AMF is derived from second information based on the analytics ID, and wherein the second information is determined based on an event identifier (ID) associated with the analytics ID; and
determining whether the MICO mode is allowed for the terminal and MICO mode parameters for the terminal based on the analytics information for the terminal requested by the AMF and at least one parameter obtained from a unified data management (UDM) or the terminal.

2. The method of claim 1,
wherein the analytics ID is set to at least one of terminal communication analytics or terminal mobility analytics.

3. The method of claim 2,
wherein the analytics information for the terminal requested by the AMF includes terminal communication information and reliability information of the terminal communication information, based on the analytics ID being set to the terminal communication analytics, and
wherein the analytics information for the terminal requested by the AMF includes terminal mobility information and reliability information of the terminal mobility information, based on the analytics ID being set to the terminal mobility analytics.

4. The method of claim 1, wherein the second information is collected by the NWDAF from at least one of application functions (AFs), network functions (NFs), or an operation, administration, and management (OAM).

5. The method of claim 1, further comprising:
wherein the MICO mode parameters for the terminal include at least one of information on an extended connected time for indicating a base station to keep the terminal in radio resource connection (RRC) connected state, information on an active time for indicating the terminal to enter the MICO mode when the active time expires, or information on a periodic registration timer for the terminal to perform a periodic registration.

6. A method performed by a network data analytics function (NWDAF) in a wireless communication system, the method comprising:
receiving, from an access and mobility management function (AMF), an analytics information request message including an analytics identification (ID) for identifying analytics information for a terminal and information on the terminal or a group of terminals;
deriving the analytics information for the terminal from first information based on the analytics ID, the first information being determined based on an event identifier (ID) associated with the analytics ID; and
transmitting, to the AMF, an analytics information response message including the analytics information for the terminal,
wherein whether a mobile initiated communication only (MICO) mode is allowed for the terminal and MICO mode parameters for the terminal are determined based on the analytics information for the terminal and at least one parameter from a unified data management (UDM) or the terminal.

7. The method of claim 6,
wherein the analytics ID is set to at least one of terminal communication analytics or terminal mobility analytics.

8. The method of claim 7,
wherein the analytics information for the terminal requested by the AMF includes terminal communication information and reliability information of the terminal communication information, based on the analytics ID being set to the terminal communication analytics, and wherein the analytics information for the terminal requested by the AMF includes terminal mobility information and reliability information of the terminal mobility information, based on the analytics ID being set to the terminal mobility analytics.

9. The method of claim 6, wherein the first information is collected from at least one of application functions (AFs), network functions (NFs), or an operation, administration, and management (OAM).

10. The method of claim 6, wherein the MICO mode parameters for the terminal include at least one of information on an extended connected time for indicating a base station to keep the terminal in radio resource connection (RRC) connected state, information on an active time for indicating the terminal to enter the MICO mode when the active time expires, or information on a periodic registration timer for the terminal to perform a periodic registration.

11. An access and mobility management function (AMF) in a wireless communication system, the AMF comprising:
a transceiver; and
a controller configured to:
control the transceiver to receive, from a terminal, a registration request message including first information for indicating preference for mobile initiated communication only (MICO) mode of the terminal,
control the transceiver to transmit, to a network data analytics function (NWDAF), an analytics information request message including an analytics identification (ID) for identifying analytics information for the terminal requested by the AMF and information on the terminal or a group of terminals,
control the transceiver to receive, from the NWDAF, an analytics information response message including the analytics information for the terminal requested by the AMF, wherein the analytics information for the terminal requested by the AlVIF is derived from second information based on the analytics ID, and wherein the second information is determined based on an event identifier (ID) associated with the analytics ID, and
determine whether the MICO mode is allowed for the terminal and MICO mode parameters for the terminal based on the analytics information for the terminal requested by the AMF and at least one parameter obtained from a unified data management (UDM) or the terminal.

12. The AMF of claim 11,
wherein the analytics ID is set to at least one of terminal communication analytics or terminal mobility analytics.

13. The AMF of claim 12,
wherein the analytics information for the terminal requested by the AMF includes terminal communication information and reliability information of the terminal communication information, based on the analytics ID being set to the terminal communication analytics, and
wherein the analytics information for the terminal requested by the AMF includes terminal mobility information and reliability information of the terminal mobility information, based on the analytics ID being set to the terminal mobility analytics.

14. The AMF of claim 11, wherein the second information is collected by the NWDAF from at least one of application functions (AFs), network functions (NFs), or an operation, administration, and management (OAM).

15. The AMF of claim 11, wherein the MICO mode parameters include at least one of information on an extended connected time for indicating a base station to keep the terminal in radio resource connection (RRC) connected state, information on an active time for indicating the terminal to enter the MICO mode when the active time expires, or information on a periodic registration timer for the terminal to perform a periodic registration.

16. A network data analytics function (NWDAF) in a wireless communication system, the NWDAF comprising:
a transceiver; and
a controller configured to:
control the transceiver to receive, from an access and mobility management function (AMF), an analytics information request message including an analytics identification (ID) for identifying analytics information for a terminal and information on the terminal or a group of terminals,
derive the analytics information for the terminal from first information based on the analytics ID, the first information being determined based on an event identifier (ID) associated with the analytics ID, and
control the transceiver to transmit, to the AMF, an analytics information response message including the analytics information for the terminal,
wherein whether a mobile initiated communication only (MICO) mode is allowed for the terminal and MICO mode parameters for the terminal are determined based on the analytics information for the terminal and at least one parameter from a unified data management (UDM) or the terminal.

17. The NWDAF of claim 16,
wherein the analytics ID is set to at least one of terminal communication analytics or terminal mobility analytics.

18. The NWDAF of claim 17,
wherein the analytics information for the terminal requested by the AMF includes terminal communication information and reliability information of the terminal communication information, based on the analytics ID being set to the terminal communication analytics, and
wherein the analytics information for the terminal requested by the AMF includes terminal mobility information and reliability information of the terminal mobility information, based on the analytics ID being set to the terminal mobility analytics.

19. The NWDAF of claim 16, wherein the first information is collected from at least one of application functions (AFs), network functions (NFs), or an operation, administration, and management (OAM).

20. The NWDAF of claim 16, wherein the MICO mode parameters include at least one of information on an extended connected time for indicating a base station to keep the terminal in radio resource connection (RRC) connected state, information on an active time for indicating the terminal to enter the MICO mode when the active time expires, or information on a periodic registration timer for the terminal to perform a periodic registration.

* * * * *